United States Patent
Yamamura et al.

(10) Patent No.: US 12,072,249 B2
(45) Date of Patent: Aug. 27, 2024

(54) SENSOR

(71) Applicants: MERCARI, INC., Tokyo (JP); The University of Tokyo, Tokyo (JP)

(72) Inventors: Ryosuke Yamamura, Tokyo (JP); Yasuaki Kakehi, Tokyo (JP); Keisuke Watanabe, Tokyo (JP)

(73) Assignees: MERCARI, INC., Tokyo (JP); THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 17/705,164

(22) Filed: Mar. 25, 2022

(65) Prior Publication Data

US 2022/0307922 A1    Sep. 29, 2022

(30) Foreign Application Priority Data

Mar. 26, 2021 (JP) .................. 2021-053176

(51) Int. Cl.
*G06F 3/03* (2006.01)
*G01L 1/00* (2006.01)
(Continued)

(52) U.S. Cl.
CPC ............ *G01L 1/005* (2013.01); *G01L 5/0038* (2013.01); *G06F 3/041* (2013.01); *G06F 1/3231* (2013.01); *G06F 2203/04105* (2013.01)

(58) Field of Classification Search
CPC .............. G06F 3/041; G06F 1/3231; G06F 2203/04105; G06F 3/03; G01L 1/005; G01L 5/0038; G01D 5/241
See application file for complete search history.

(56) References Cited

U.S. PATENT DOCUMENTS

| | | | |
|---|---|---|---|
| 7,366,332 B2 * | 4/2008 | Shimamura | G06V 40/1394 382/125 |
| 7,878,075 B2 * | 2/2011 | Johansson | B25J 13/084 73/862.046 |

(Continued)

FOREIGN PATENT DOCUMENTS

| | | |
|---|---|---|
| JP | 3028642 U | 9/1996 |
| JP | 2010514036 A | 4/2010 |

(Continued)

OTHER PUBLICATIONS

Satoshi Nakamaru, Ryosuke Nakayama, Ryuma Niiyama and Yasuaki Kakehi, "Foam Sense: Design of Three Dimensional Soft-Sensors with Porous Materials," (UIST 2017), Association for Computing Machinery, New York, NT, USA, 437-447, https://doi.org/10.1145/3126594.3126666, 11 pgs.

*Primary Examiner* — Olga V Merkoulova
(74) *Attorney, Agent, or Firm* — Morgan, Lewis & Bockius LLP

(57) ABSTRACT

Provided is a sensor that is able to efficiently identify a variety of motions made by a user. The sensor includes: a structure body configured to be deformable by an external force; an electrode configured to be disposed at an arbitrary position of the structure body; a determination unit configured to determine a contact state of an object with the structure body based on a change in impedance measured using the electrode; and an output unit configured to output a signal based on the contact state of the object with the structure body to an external device.

8 Claims, 17 Drawing Sheets

(51) Int. Cl.
  *G01L 5/00*   (2006.01)
  *G06F 3/041*   (2006.01)
  *G06F 1/3231*   (2019.01)

(56) References Cited

U.S. PATENT DOCUMENTS

| | | | |
|---|---|---|---|
| 8,272,278 B2* | 9/2012 | Loeb | G01L 5/228 |
| | | | 374/45 |
| 10,814,493 B2* | 10/2020 | Duchaine | G01L 9/0051 |
| 10,824,281 B2* | 11/2020 | Kong | G06F 3/0416 |
| 11,269,471 B2* | 3/2022 | Lin | G06F 3/03547 |
| 2005/0259850 A1* | 11/2005 | Shimamura | G06V 40/1394 |
| | | | 382/124 |
| 2009/0133508 A1* | 5/2009 | Johansson | G01L 5/228 |
| | | | 73/862.046 |
| 2009/0272201 A1* | 11/2009 | Loeb | G01L 5/228 |
| | | | 73/862.041 |
| 2010/0096247 A1 | 4/2010 | Marie et al. | |
| 2014/0221808 A1* | 8/2014 | Furue | A61B 46/40 |
| | | | 128/849 |
| 2014/0365009 A1 | 12/2014 | Wettels | |
| 2019/0346974 A1* | 11/2019 | Lin | G06F 3/044 |
| 2020/0039084 A1* | 2/2020 | Duchaine | G01L 1/20 |
| 2020/0209085 A1* | 7/2020 | Wettels | B25J 13/084 |

FOREIGN PATENT DOCUMENTS

| | | |
|---|---|---|
| JP | 2014068989 A | 4/2014 |
| JP | 2016528483 A | 9/2016 |
| JP | 2018194387 A | 12/2018 |

\* cited by examiner

Fig. 5
(a) 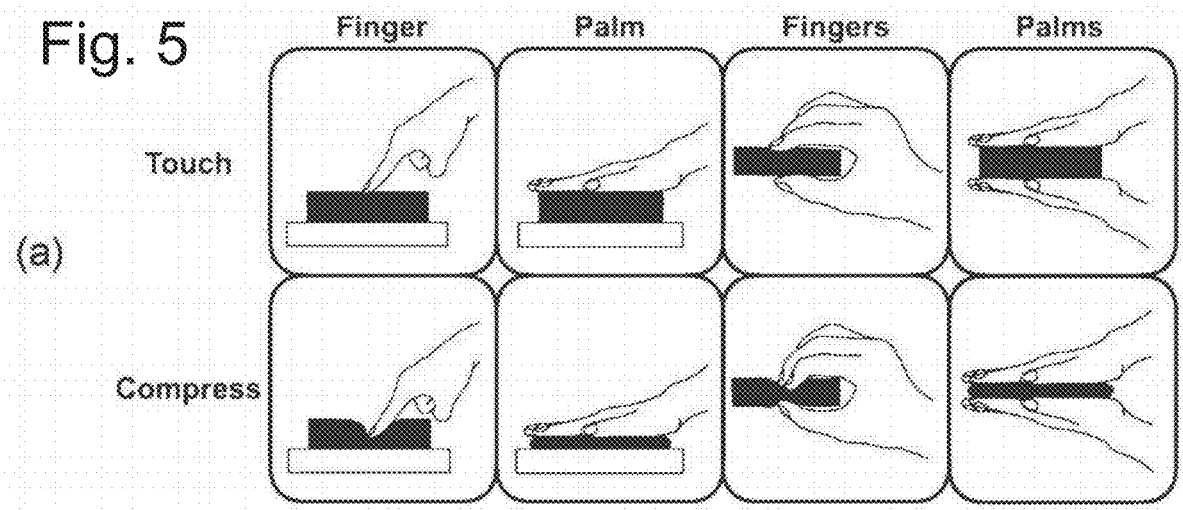
(b) 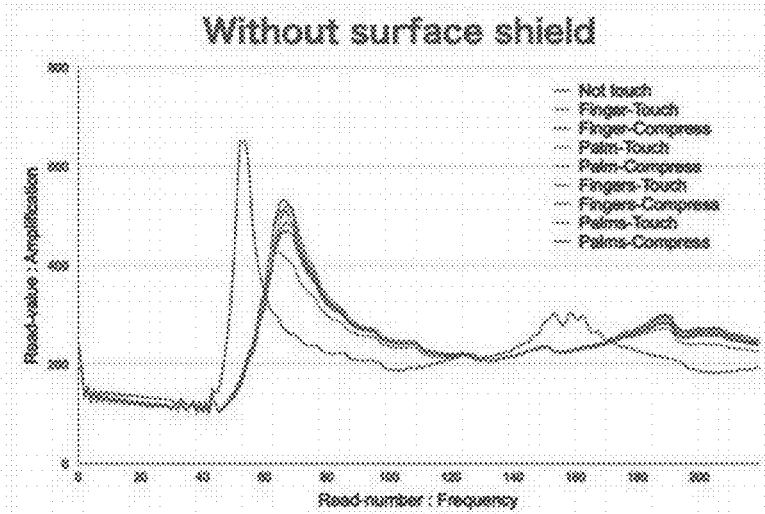
(c) 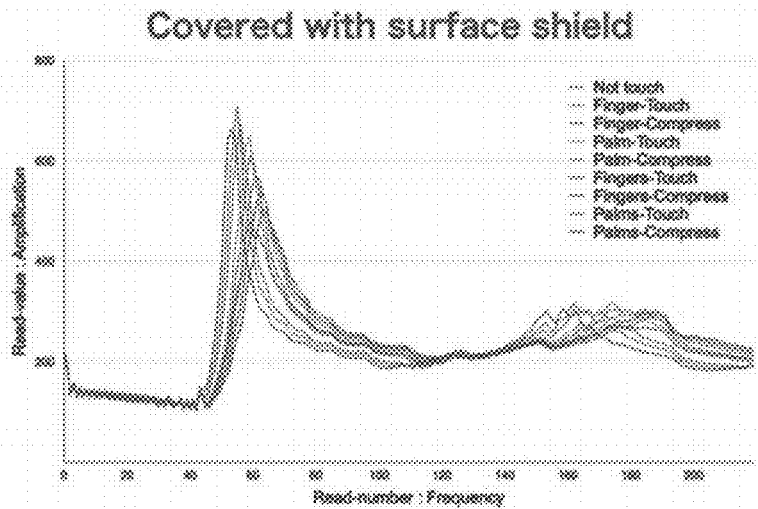

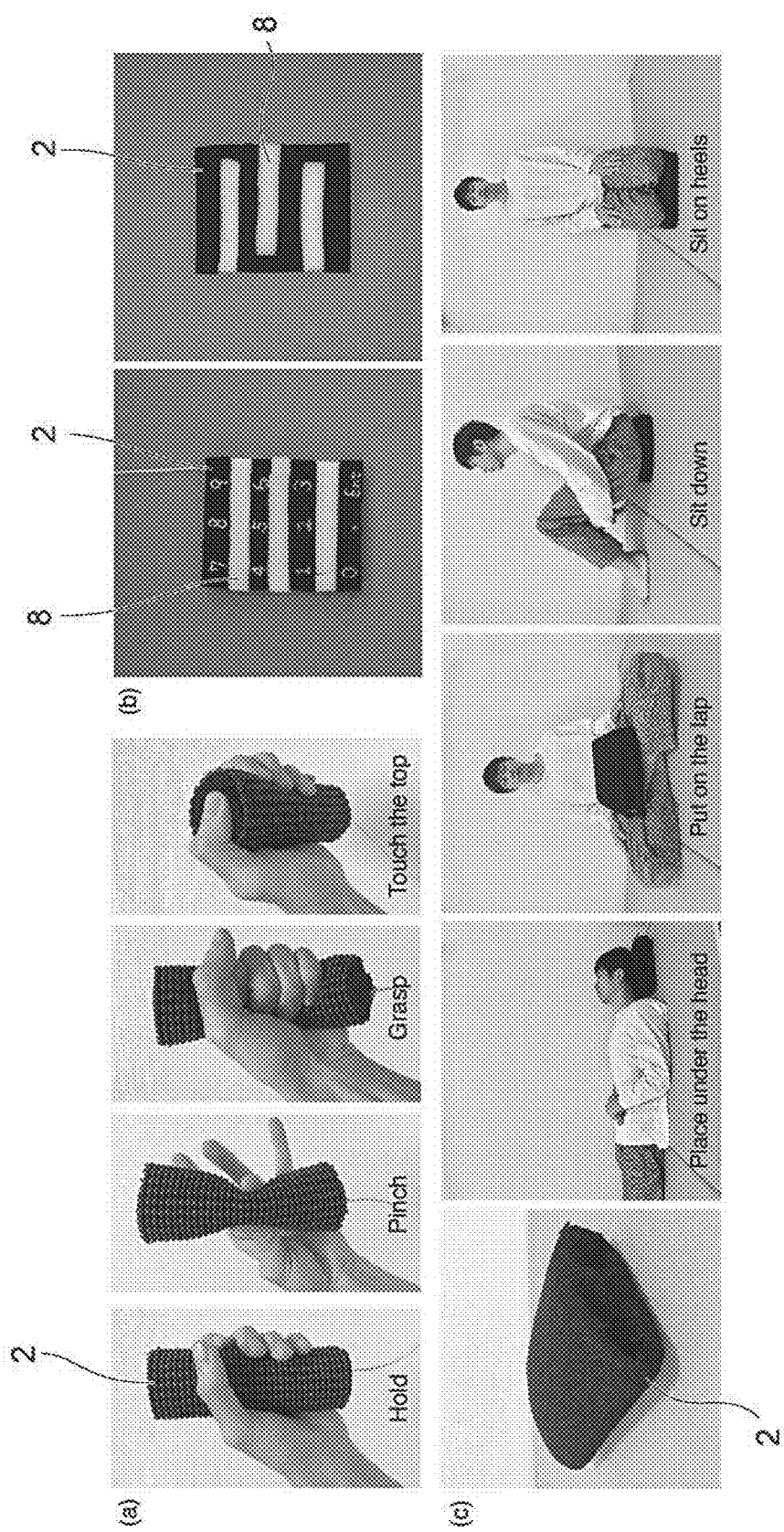

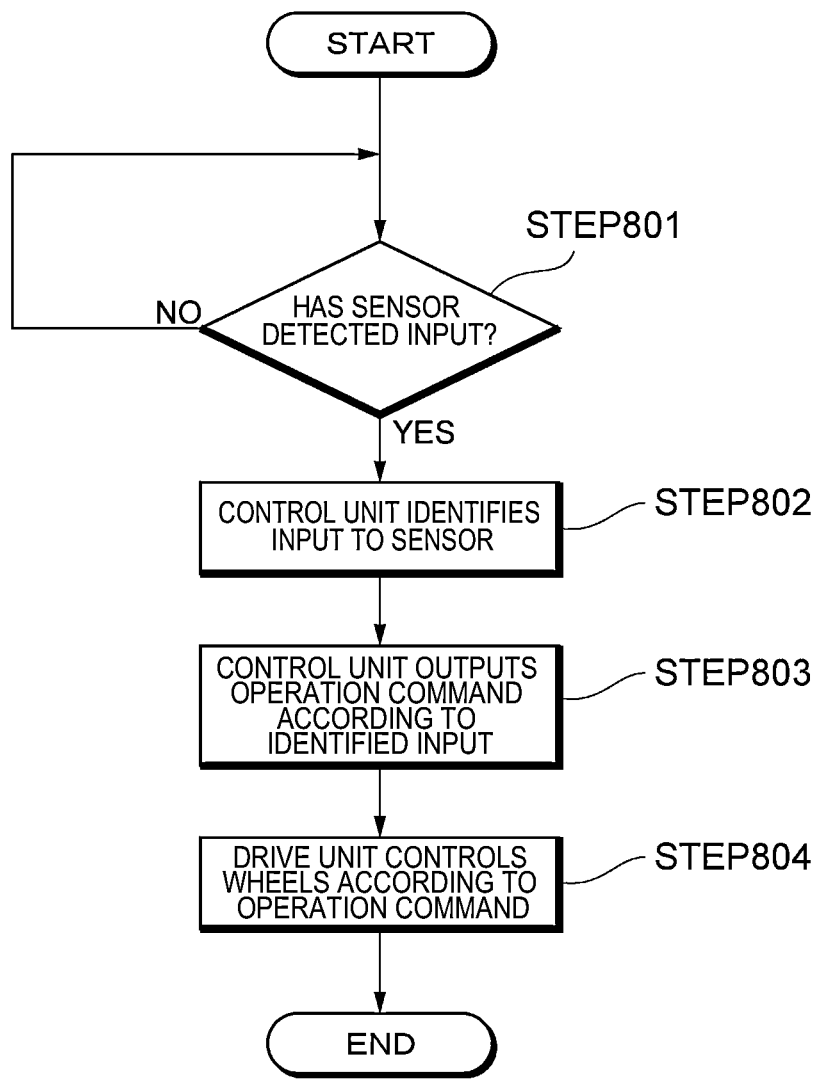

SENSOR

CROSS-REFERENCE TO RELATED APPLICATION

This application claims priority to Japanese Patent Application No. 2021-053176 filed on Mar. 26, 2021, which is incorporated herein by reference in its entirety.

TECHNICAL FIELD

The present invention relates to a sensor.

DESCRIPTION OF RELATED ART

In recent years, the development of sensors using a material that is deformable by an external force has been advanced. This type of sensor detects the deformation thereof caused by a motion of a user, such as grasping or compressing, and identifies the kind of motion based on the detection results.

For example, Patent Document 1 describes a sensor element that is made conductive by impregnating a conductive ink into a porous structure body that is deformable by an external force. Patent Document 1 further describes a method of determining a state of the sensor element based on a resistance value between two electrodes attached to the sensor element. Further, Non-Patent Document 1 describes a sensor that detects the deformation thereof such as compressing, bending, twisting, or shearing by using a porous material containing a conductive ink.

SUMMARY

However, with the conventional sensors described above, for example, it is only possible to detect a single motion such as compressing between the two electrodes, and in order to identify a plurality of motions, it is necessary to combine the sensor and the wiring to create a complicated configuration.

The present invention has been made in view of the circumstances described above, and has an object to provide a sensor that is able to efficiently identify a variety of motions made by a user.

A sensor according to the present invention includes: a structure body configured to be deformable by an external force; an electrode configured to be disposed at an arbitrary position of the structure body; a determination unit configured to determine a contact state of an object with the structure body based on a change in impedance measured using the electrode; and an output unit configured to output a signal based on the contact state of the object with the structure body to an external device.

According to the present invention, it is possible to provide a sensor that is able to efficiently identify a variety of motions made by a user.

BRIEF DESCRIPTION OF DRAWINGS

FIG. 5 illustrates diagrams for explaining a determination process of the sensor 1 according to the embodiment of the present invention;

FIG. 7 illustrates diagrams for explaining examples of use of the sensor 1 according to the embodiment of the present invention;

FIG. 8C is a flowchart illustrating the operation of the first example of the system using the sensor according to the present invention;

Figure 1:
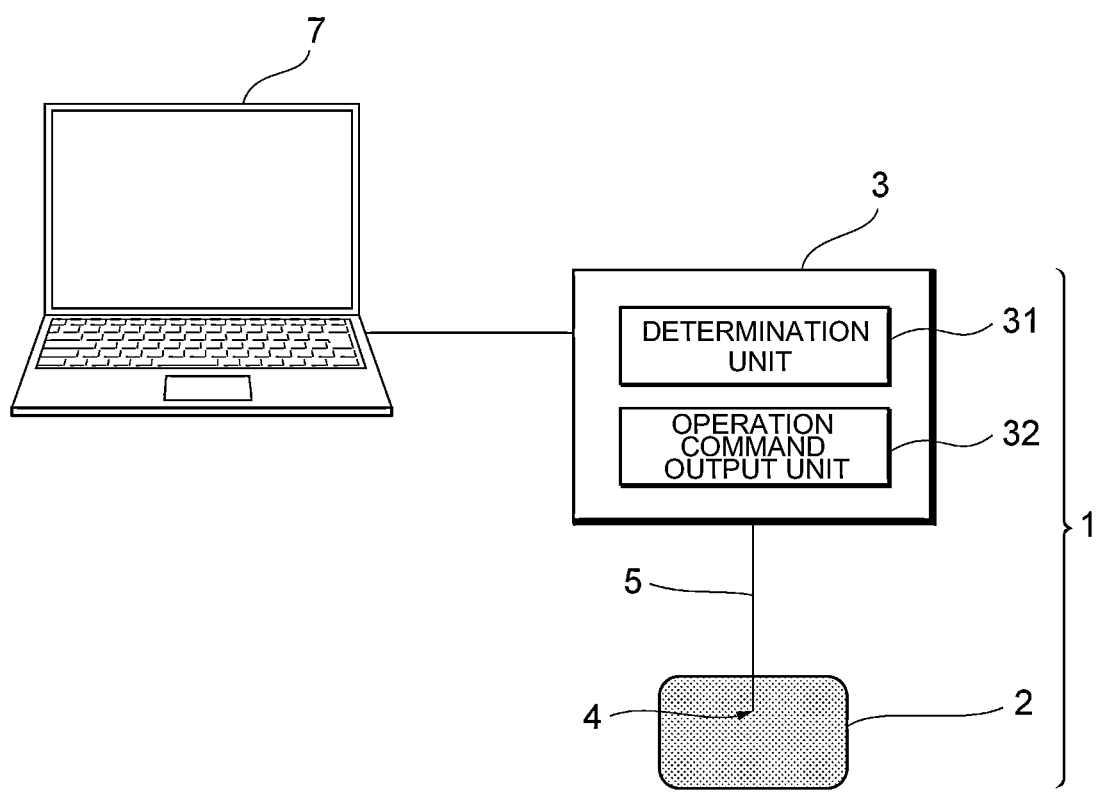
FIG. 1 is a schematic diagram illustrating the configuration of a sensor 1 according to an embodiment of the present invention.

DESCRIPTION OF REFERENCE SIGNS 1 sensor
2 structure body
3 control unit
4 electrode
5 wire
6 shield member
7 external device
8 non-conductive member
18, 19, 20 system
21 piece of furniture
31 determination unit
32 operation command output unit
61 opening
71 moving body
72 terminal
73 home appliance
121 processor
122 memory
123 storage
124 input-output I/F
125 input device
126 output device 127 transmission-reception unit
211 mattress
311 impedance measuring instrument
312 classifier
711 wheel
712 armrest
713 drive unit
721 output control unit
722 storage unit
723 processing unit
731 home appliance control unit
1221 program
7231 authentication unit

DETAILED DESCRIPTION

Hereinafter, an embodiment of the present invention will be described in detail with reference to the drawings. The same reference signs will be given to the same elements, and a duplicate description thereof will be omitted.

Embodiment

FIG. 1 is a schematic diagram illustrating the configuration of a sensor 1 according to an embodiment of the present invention. As illustrated in FIG. 1, the sensor 1 includes a structure body 2 having flexibility and conductivity, a control unit 3, an electrode 4, and a wire 5 connecting the control unit 3 and the electrode 4. The structure body 2 is not necessarily flexible as long as it is deformable by an external force. The sensor 1 is connected to an external device 7 via a communication line. The communication line may be wired or wireless. The structure body 2 is deformed by a motion (a contact state) of a user touching or pushing the structure body 2 with a finger (an object). Particularly when the structure body 2 is flexible, the structure body 2 is three-dimensionally deformed by the motion of the user. This deformation state of the structure body 2 is detected based on a change in impedance, and an operation command corresponding to the motion of the user is output to the external device 7. The external device 7 may be an arbitrary device such as, for example, a personal computer, a tablet terminal, a smartphone, a single-board computer, a game console, an electronic musical instrument, or a moving body (electric bicycle, automobile, or the like). When, for example, an analog circuit is used as the external device 7, it is possible to handle a continuous value as an output signal.

Although the control unit 3 is described as a part of the configuration of the sensor 1 in the example of FIG. 1, the present invention is not limited thereto. For example, the control unit 3 may be configured in the same housing as the external device 7.

Figure 2:
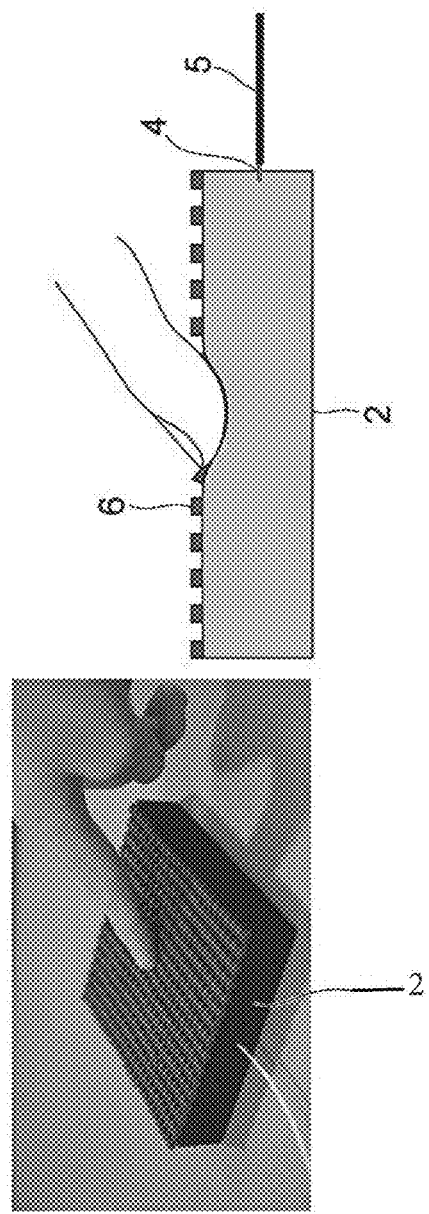
FIG. 2 is a diagram illustrating the configuration of a structure body 2 of the sensor 1 according to the embodiment of the present invention.

The structure body 2 is made of a porous material having conductivity, such as, for example, conductive polyurethane. FIG. 2 is a diagram illustrating the configuration of the structure body 2. As illustrated in FIG. 2, the electrode 4 is embedded in the structure body 2 and connected to the control unit 3 via the wire 5. The electrode 4 can be attached to an arbitrary position of the structure body 2.

Figure 3:
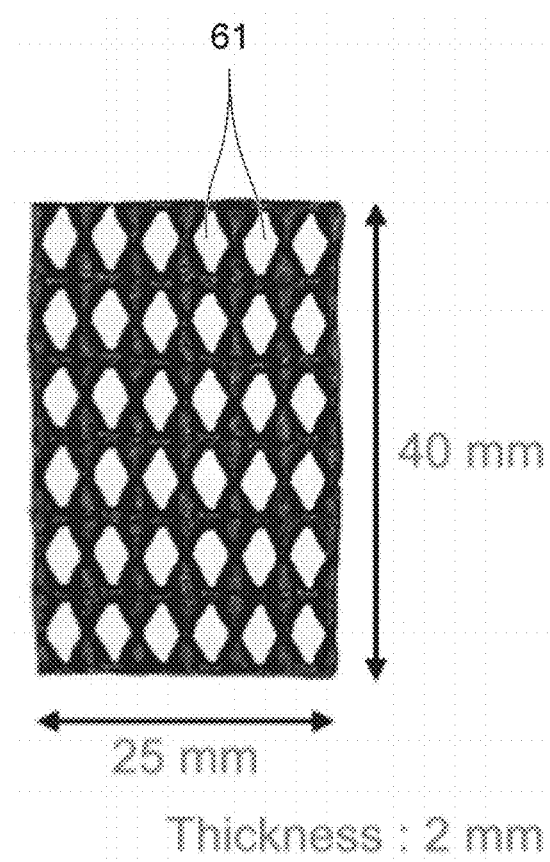
FIG. 3 is a diagram illustrating the configuration of a shield member 6 of the sensor 1 according to the embodiment of the present invention.

In order to more accurately detect the deformation by an external force, it is preferable to provide an insulating shield member 6 on a surface of the structure body 2. FIG. 3 is a diagram illustrating the configuration of the shield member 6. As illustrated in FIG. 3, the shield member 6 is a cover having a plurality of mesh openings 61 and is made of an insulating material. In the case where the shield member 6 is provided, the object and the structure body 2 come in direct contact with each other only at the openings 61 of the shield member 6. The shield member 6 has a certain degree of thickness (e.g., about 1 mm to 3 mm). Therefore, the object does not directly contact the structure body 2 when lightly touching the shield member 6 with a fingertip. Further, the area of a contact surface with the structure body 2 changes depending on the strength of the pushing of the fingertip. The shield member 6 is not limited to the mesh cover illustrated in FIG. 3 and may be, for example, a cover having one or a plurality of openings 61 such as a cover having a plurality of slits.

The control unit 3 includes a determination unit 31 and an operation command output unit 32. The determination unit 31 measures the impedance of the structure body 2 using the electrode 4 and determines the contact state of the object with the structure body 2 based on the measurement results. The impedance changes by the distance between the contact position of the object with the structure body 2 and the electrode 4, the area of the contact surface, the pressing on the contact surface by the object, the material of the contacting object, or the like.

Next, referring to FIGS. 4 to 6, a determination process of a specific motion by the sensor 1 according to this embodiment will be described.

Figure 4:
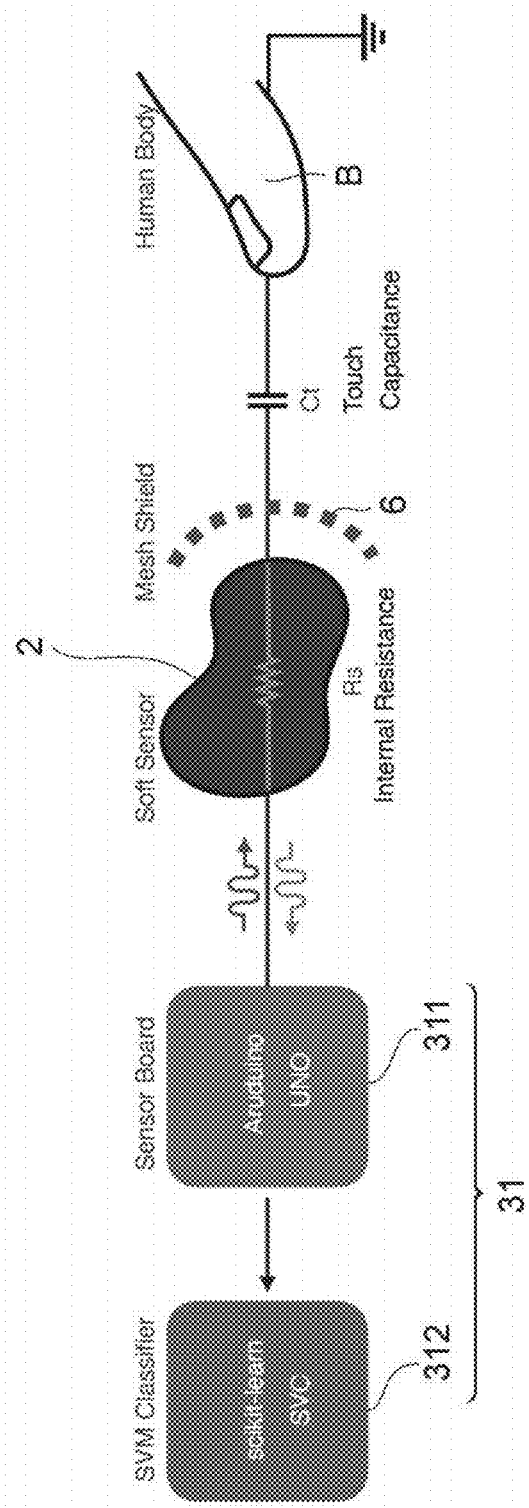
FIG. 4 is a schematic diagram illustrating the circuit configuration of the sensor 1 according to the embodiment of the present invention.

FIG. 4 is a schematic diagram illustrating the circuit configuration of the sensor 1. The sensor 1 uses an impedance measuring instrument 311 to measure the impedance obtained when an alternating-current (AC) voltage is applied to the structure body 2. Data of the measured impedance is classified in a classifier 312.

When a user contacts the structure body 2 with a fingertip (an object B) or the like to deform the structure body 2, the impedance measured by the impedance measuring instrument 311 changes according to the distance between the contact position of the object B and the electrode 4, the area of the contact surface with the object B, the pressing applied to the contact surface by the object B, the material of the object B, and so on. An internal resistance Rs of the structure body 2 and a capacitance Ct between the object B and the structure body 2 can be regarded as an RC series circuit, and an impedance Z can be expressed by formula (1) below. In the classifier 312, a pattern of impedance measured is classified based on its feature, and it is possible to identify the motion given by the object B to the structure body 2, or the deformation state of the structure body 2. For example, the classifier 312 is able to identify it based on the peak frequency of impedance and/or the height of the peak of impedance. Further, for example, the classifier 312 is also able to perform image recognition of the waveform of impedance to extract its feature values, thereby identifying the motion.

$$Z = \sqrt{R_s^2 + \frac{1}{(\omega C_1)^2}} \tag{1}$$

The impedance measuring instrument 311 acquires a pattern of impedance of the structure body 2 by swept frequency capacitive sensing (SFCS). The impedance measuring instrument 311 is able to acquire a peak or waveform of impedance as the pattern of impedance. Specifically, when acquiring the peak of impedance, the AC voltage applied to the structure body 2 via the electrode 4 is swept at a plurality of frequencies of a certain range (e.g., 184 different frequencies in the range of 35 kHz to 200 kHz).

Sweep frequencies are controlled to be selected at regular intervals, and the peak of impedance at each of the frequencies is acquired. The impedance measuring instrument 311 can be realized by, for example, implementing a program that executes SFCS, in a microcomputer board such as Arduino Uno (registered trademark) manufactured by Arduino LLC or Arduino SRL. The impedance measuring instrument 311 can also be realized by implementing a program that executes SFCS, in a processor of a general purpose computer.

The classifier 312 determines the motion of the user based on the pattern of impedance acquired by the impedance measuring instrument 311. The classifier 312 is a learned model that has learned in advance the correlation between the pattern of impedance and the motion of the user (the object B) to the structure body 2. The learned model of the classifier 312 may alternatively be a model that has learned the correlation between the deformation state of the structure body 2 caused by an external force from the object B such as the fingertip, and the pattern of impedance. With the classifier 312 being the learned model, even when the pattern of impedance includes an error, it can be allowed so that it is possible to improve the identification accuracy of the sensor 1. Herein, the deformation state refers to, for example, any of the contact position between the object B and the structure body 2, the contact area, and the compressing state, or an arbitrary combination of them. Further, the learned model of the classifier 312 may alternatively be a model that has learned the correlation between (1) the material of the object B, (2) the pattern of impedance, and (3) the deformation state of the structure body 2 or the input motion of the user via the object B. The change in impedance of the structure body 2 differs depending on the material of the object B. Further, when the object B is the human finger or the like, it differs depending on the person. Therefore, by learning the correlation between the material of the object B and the pattern of impedance, the classifier 312 is able to identify the user who is in contact with the structure body 2, for example.

Specifically, the classifier 312 can be realized by causing a processor of a computer to execute an algorithm such as a linear support vector machine. The algorithm used for the classifier 312 is not limited to the support vector machine, and it is possible to use any algorithm that constructs a model for classification of new data using learning data.

In the training process of the classifier 312, for example, about ten kinds of motions are performed to the structure body 2 for about a few seconds, and patterns of impedance acquired during that time can be used as learning data.

The classifier 312 is not necessarily limited to the configuration that determines the motion using the learned model. For example, the classifier 312 may be stored in advance with a correspondence table between the deformation state of the structure body 2 and the pattern of impedance and make a determination based on this correspondence table. The correspondence table to be stored may alternatively be a correspondence table between the motion of the user and the pattern of impedance.

FIG. 5 illustrates diagrams for explaining a determination process of the motion by the sensor 1. In the example of FIG. 5, a description will be given of an example of determinations of eight kinds of motions in which the area of a contact surface with the structure body 2 or the pressing on the contact surface differs from each other. As illustrated in FIG. 5(a), the eight kinds of motions are respectively a motion of touching (Touch) or compressing (Compress) one surface of the structure body 2 with a finger, a motion of touching or compressing one surface of the structure body 2 with a palm, a motion of touching or compressing both surfaces of the structure body 2 with fingers, and a motion of touching or compressing both surfaces of the structure body 2 with palms.

The motions that can be identified by the sensor 1 are not limited thereto, and it is possible to identify arbitrary motions such as twisting and bending.

FIGS. 5(b) and (c) illustrate patterns of impedance measured for the respective motions. FIG. 5(b) illustrates the results measured in the state where the shield member 6 is not provided on the surface of the structure body 2, and FIG. 5(c) illustrates the results measured in the state where the shield member 6 is provided on the surface of the structure body 2. As illustrated in FIGS. 5(b) and (c), the frequency at which the peak of impedance is detected, and the height of the peak of impedance differ depending on the kind of motion.

The classifier 312 determines the motion of the user or the deformation state of the structure body 2 based on the patterns of impedance illustrated in FIGS. 5(b) or (c). For example, it is possible to make such a determination based on the frequency at which the peak of impedance is detected, and/or the height of the peak of impedance.

The operation command output unit 32 outputs an operation command to the external device 7 based on the motion of the user or the deformation state of the structure body 2 determined in the classifier 312. Specifically, a correspondence table between the motion of the user or the deformation state of the structure body 2 and the operation command to be output may be stored in advance, and the operation command output unit 32 may output an operation command specified based on this correspondence table.

The accuracy of classification when measured in the state where the shield member 6 is not provided as in FIG. 5(b) is 80% or more, and the accuracy of classification when measured in the state where the shield member 6 is provided as in FIG. 5(c) is approximately 100%. By providing the shield member 6 on the contact surface with the finger or palm, it is possible to allow the finger or palm to directly contact the structure body 2 only when a force exceeding a predetermined threshold is applied by the motion. Consequently, it is easy to identify the difference in pressing such as the difference between touching and compressing so that the determination accuracy of the motion is improved.

Figure 6:
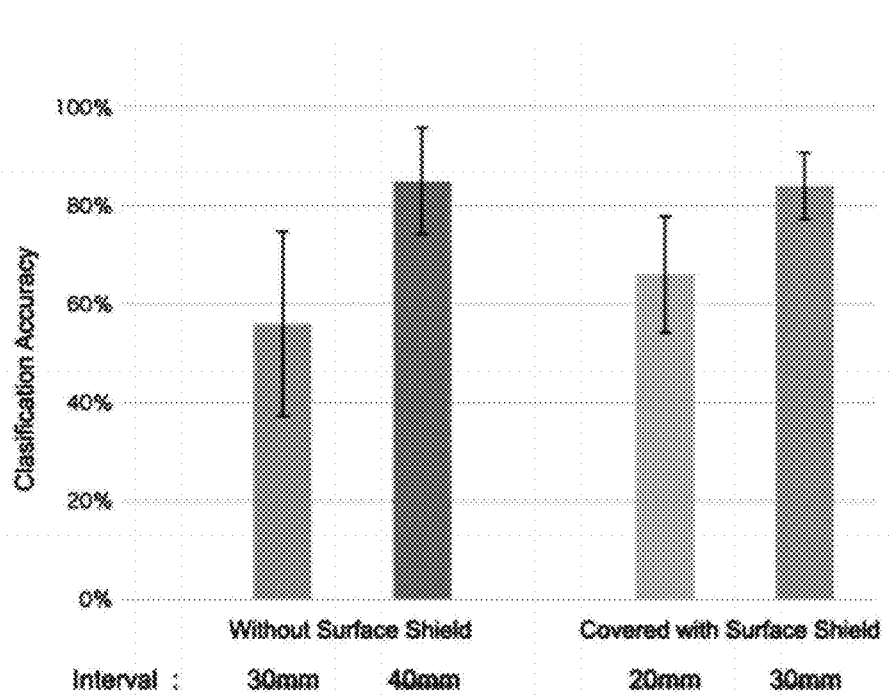
FIG. 6 is a diagram for explaining the determination process of the sensor 1 according to the embodiment of the present invention.

FIG. 6 is a diagram for explaining the determination accuracy about the difference in distance between the contact position and the electrode 4. Two graphs on the left side are measured in the state where the shield member 6 is not provided on the surface of the structure body 2, wherein the determination accuracy about a difference in distance of 30 mm is 40% or more, and the determination accuracy about a difference in distance of 40 mm is 80% or more. On the other hand, two graphs on the right side are measured in the state where the shield member 6 is provided on the surface of the structure body 2, wherein the determination accuracy about a difference in distance of 20 mm is 60% or more, and the determination accuracy about a difference in distance of 30 mm is 80% or more.

The impedance to be measured also changes according to the material of the object that contacts the structure body 2. For example, the impedance to be measured changes between when the user touches the structure body 2 with a fingertip (skin), when touching it with a fingernail, and when touching it using a tool. Therefore, by causing the classifier 312 to learn in advance patterns of impedance when contacts are made by objects of different materials, even when the deformation states of the structure body 2 are the same, it is possible to distinguish them as different motions by the difference in contacting material so that it is possible to correlate the respective motions with corresponding operation commands.

Modification of Embodiment

In the embodiment described above, the configuration has been described in which the control unit 3 is configured such that the determination unit 31 identifies the input motion of the user or the deformation state of the structure body 2 from the pattern of impedance, and the operation command output unit 32 specifies the operation command to be output based on the identified input motion or deformation state. However, the configuration of the control unit 3 is not limited thereto. For example, the configuration may be such that the determination unit 31 identifies the corresponding operation command from the pattern of impedance, and the operation command output unit 32 outputs the identified operation command. In this case, it is preferable that the classifier 312 of the determination unit 31 have a table storing the correspondence relationship between the pattern of impedance and the operation command to be output. It is more preferable that the classifier 312 be a learned model that has learned in advance the correlation between the pattern of impedance and the operation command to be output. In this case, the output command corresponding to the input motion to the sensor 1 can be determined more accurately.

Examples of Use

The sensor 1 is configured such that when the determination unit 31 determines the motion, the operation command output unit 32 outputs the command corresponding to the determined motion to the external device 7, thereby causing the external device 7 to perform various operations.

FIG. 7 illustrates diagrams showing examples of use of the sensor 1 according to the present invention. FIG. 7(a) illustrates a use example to play an electronic musical instrument (the external device 7) by motions. In the example of FIG. 7(a), the structure body 2 has a bar shape, and the scale and the volume are changed by the contact position and strength while holding, pinching, and so on.

FIG. 7(b) illustrates an example of using the sensor 1 as a numeric keypad. As illustrated in FIG. 7(b), the numeric keypad is configured by folding the single elongated structure body 2 into a zigzag shape and sandwiching non-conductive members 8 between the sides of the zigzag shape. Buttons of numerals 0 to 9, a decimal point button, and an enter key button are assigned to the structure body 2. The positions of the respective buttons differ in distance from the electrode 4. That is, in the example of FIG. 7(b), the button of "9" is the closest to the electrode 4, and the enter key button is the farthest from the electrode 4. When a user pushes any of the buttons with a fingertip, a change in impedance according to the distance between the pushing position and the electrode 4 is detected so that it is possible to determine which of the buttons is pushed. The shape of the structure body 2 is not limited to the zigzag shape and may be any shape as long as the distances from the electrode 4 differ from each other to make it possible to assign the key buttons.

FIG. 7(c) illustrates an example of using the sensor 1 as a cushion or a pillow to determine daily behavior, daily posture, or the like, thereby using the sensor 1 in a health monitor or the like. It is possible to detect various motions of a user such as those illustrated in FIG. 7(c) according to the pressing applied to the sensor 1 by the shoulder, the elbow, the waist, or the like and the contact area.

As will be described in detail later in a first example, an automobile, a machine, or a game console may be driven using the sensor 1. In this case, it is possible to perform the driving using a finger or another part of the human body, such as an elbow, a foot, or a neck.

Figure 8A:
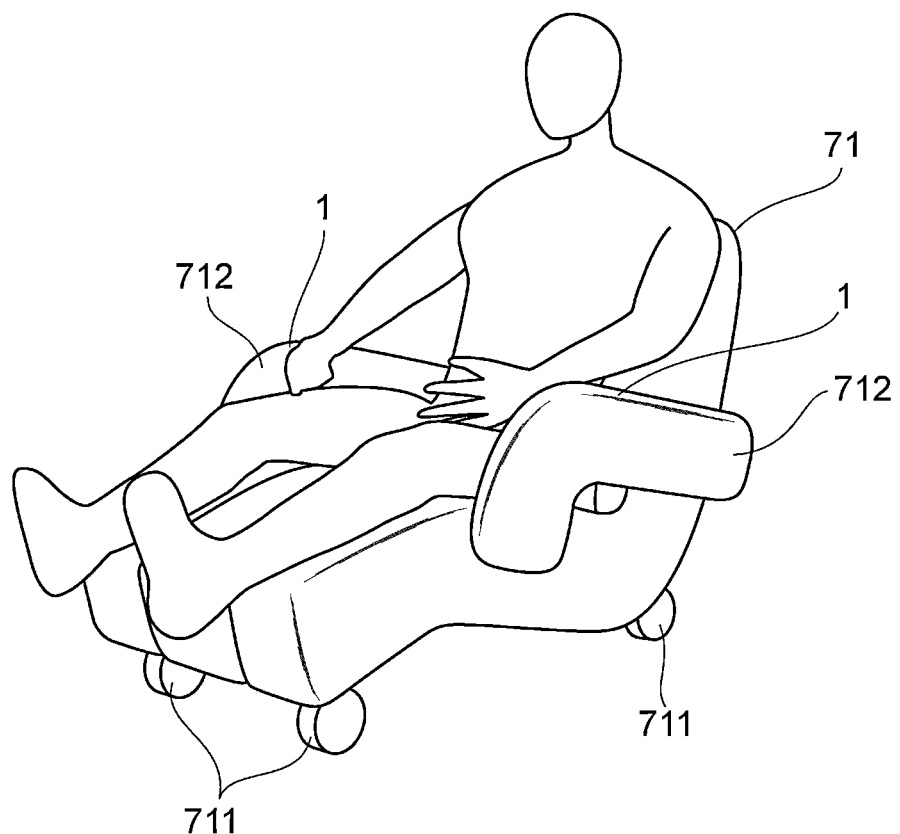
FIG. 8A is a diagram schematically illustrating the configuration of a first example of a system using a sensor according to the present invention.

As will be described in detail later in a second example, the sensor 1 can also be used in an identity verification process. For example, the change in impedance based on a motion such as grasping or holding down the structure body 2 differs depending on the person. Therefore, by causing the classifier 312 to learn in advance patterns of impedance based on motions of a specific user, it is possible to identify the user based on the pattern of impedance. The sensor 1 performs identity verification based on a pattern of impedance measured and outputs the authentication results to the external device 7. First Example Referring to FIG. 8A to FIG. 8C, a system 18 using the sensor 1 according to a first example will be described. FIG. 8A is a diagram schematically illustrating the configuration of the first example of the system 18. In the example illustrated in FIG. 8A, the system 18 includes a moving body 71 and the sensors 1.

The moving body 71 corresponds to the external device 7 described above and is a sofa-type moving body in the first example. The moving body 71 includes a pair of armrests 712 and wheels 711. In the first example, the moving body 71 includes the four wheels 711, but the present invention is not limited thereto.

The sensor 1 is provided to an upper surface of each of the armrests 712, for example. With this configuration, a user can input a motion to the sensor 1 using an elbow or hand (the object B). In this case, the sensor 1 included in the armrest 712 outputs an operation command corresponding to the identified input to a drive unit 713 (see FIG. 8B) of the moving body 71. The drive unit 713 controls the movement of the moving body 71 based on the input operation command. It is possible to map various movements (including the stop) of the moving body 71 to various motions of the user, such as, for example, when the user pushes the front of the armrest 712, the moving body 71 moves forward, when the user pushes the rear of the armrest 712, the moving body 71 moves rearward, and when the user grasps the armrest 712, the moving body 71 stops. It may alternatively be configured that the sensor 1 is provided to a seat surface or a backrest of the moving body 71. In this case, the user can operate the moving body 71 by the depth of sitting in the moving body 71 or the angle of the back. Although not illustrated, it is preferable that the shield member 6 described above be provided on the surface of the sensor 1.

The sensor 1 is not limited to being provided to the moving body 71 and can be a separate member as illustrated in FIG. 7(c). The separate member may be, for example, a wearable device type like a glove or a controller type. In the case of the glove type, it is possible to operate the sensor 1 by closing or opening a palm, bending a predetermined finger, or the like. In this case, it is possible to carry only the sensor 1 and connect the sensor 1 to the prepared moving body 71, thereby making it possible to operate the moving body 71.

Figure 8B:
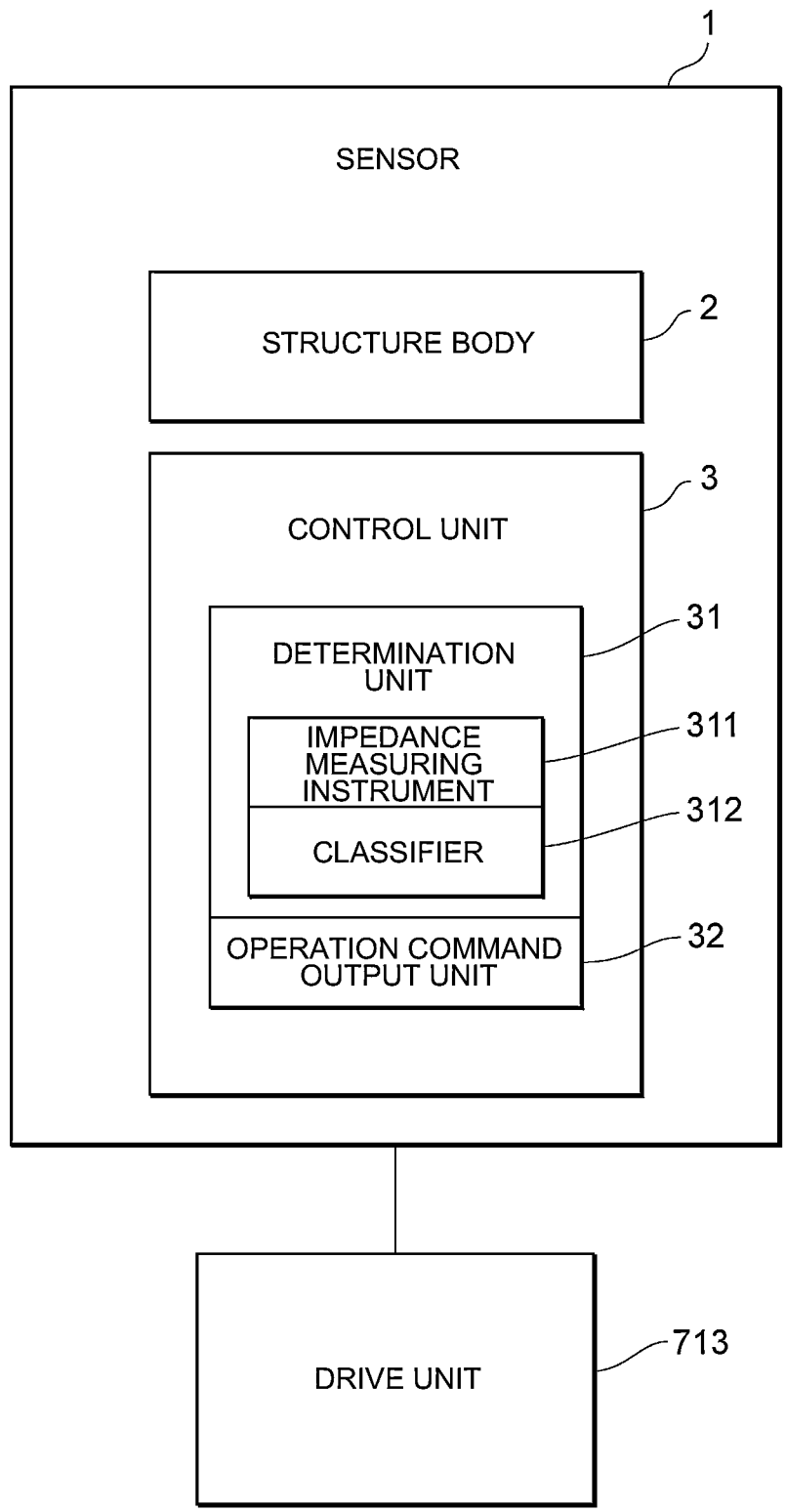
FIG. 8B is a block diagram illustrating the functional configuration of the first example of the system using the sensor according to the present invention.

Referring to FIG. 8B, the function of the system 18 will be described. FIG. 8B is a functional block diagram illustrating the function of the system 18. As described above, the sensor 1 includes the structure body 2 and the control unit 3. The function of the structure body 2 is as described above.

The control unit 3 identifies an input motion to the structure body 2 and outputs an operation command to the drive unit 713. The other functions are as described above.

The moving body 71 includes at least the drive unit 713. The drive unit 713 controls the wheels 711 in response to the operation command from the control unit 3.

Referring to FIG. 8C, the processing flow when the user operates the moving body 71 using the sensor 1 will be described. FIG. 8C is one example of a flowchart of the system 18.

When the user inputs an operation to the sensor 1 provided to the armrest 712 by the hand or elbow, the sensor 1 detects an input (STEP801: YES). The operation is, for example, compressing the sensor 1 by the elbow, inclining the elbow to an arbitrary angle while pushing the elbow on the sensor 1, or the like.

The control unit 3 identifies the input to the sensor 1 (STEP802) and outputs an operation command to the drive unit 713 according to the identified input (STEP803). The drive unit 713 controls the wheels 711 according to the output operation command (STEP804) so that the moving body 71 is operated.

As described above, according to the first example, the user can operate the sofa-type moving body 71 by the sensor 1. This makes it possible that, for example, even a user with a disability such as a hand missing can easily operate the moving body 71. The sensor 1 may be provided to the seat surface or backrest of the moving body 71.

In the first example, the configuration has been described in which the control unit 3 of the sensor 1 includes the determination unit 31 including the impedance measuring instrument (or impedance measurement unit) 311 and the classifier (or classification unit) 312, and the operation command output unit 32. However, the present invention is not limited thereto, and it may alternatively be configured that the control unit 3 includes the determination unit 31 including the impedance measuring instrument 311 and the drive unit 713 includes the classifier 312 and the operation command output unit 32. For example, the sensor 1 may output a pattern of impedance identified by the determination unit 31 to the external device 7, and the external device 7 may perform an operation based on an operation command corresponding to the pattern of impedance acquired from the sensor 1. In the first example, the configuration of operating the moving body has been described. However, the present invention is not limited thereto, and it may alternatively be configured to operate a game console or the like.

Second Example

Figure 9A:
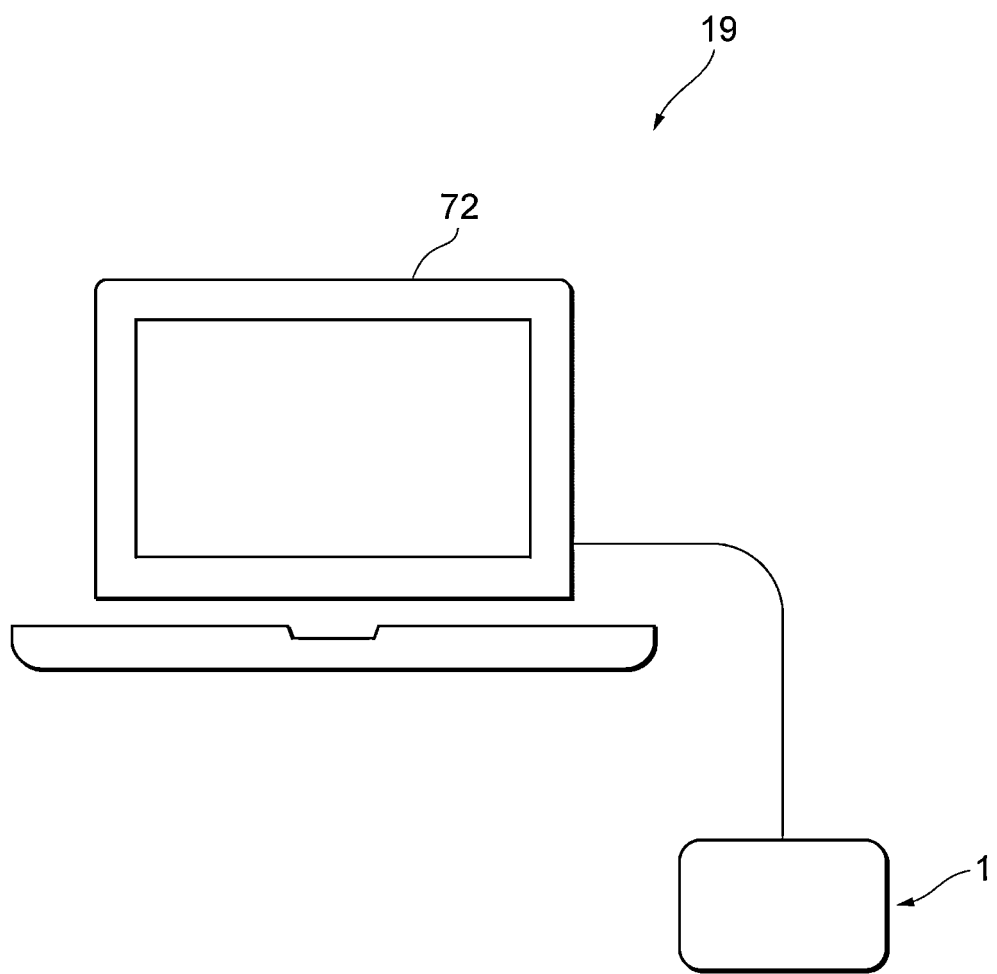
FIG. 9A is a diagram schematically illustrating the configuration of a second example of a system using a sensor according to the present invention.

Referring to FIG. 9A to FIG. 9D, a system 19 using the sensor 1 according to a second example will be described. FIG. 9A is a diagram schematically illustrating the configuration of the second example of the system 19. In the example illustrated in FIG. 9A, the system 19 includes a terminal 72 and the sensor 1.

Figure 9B:
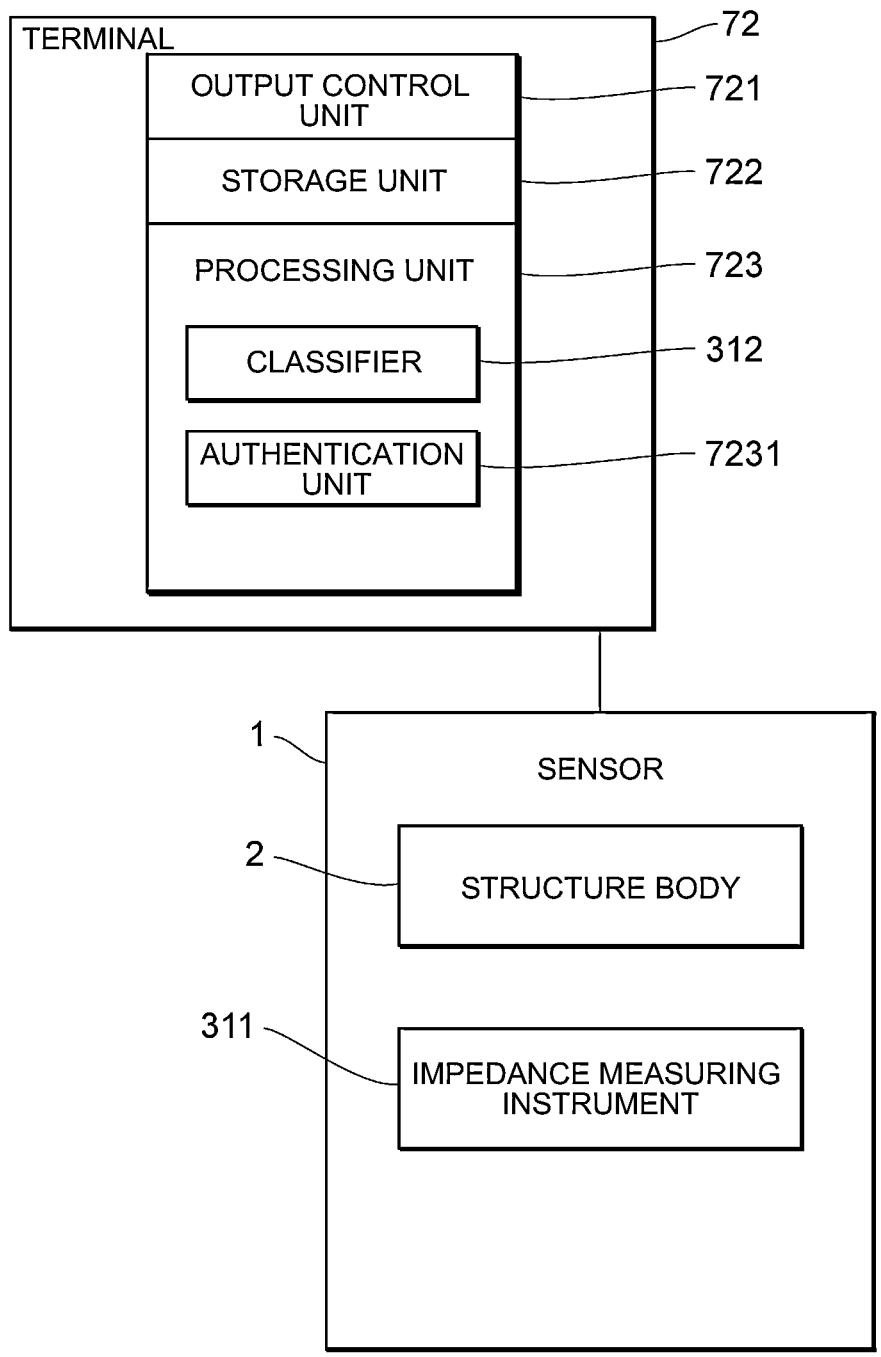
FIG. 9B is a block diagram illustrating the functional configuration of the second example of the system using the sensor according to the present invention.

Referring to FIG. 9B, the function of the system 19 will be described. FIG. 9B is one example of a functional block diagram of the system 19. In the second example, the sensor 1 includes the structure body 2 and the impedance measuring instrument (the impedance measurement unit) 311 and outputs a change in impedance measured due to operating the structure body 2, to the terminal 72. The other configuration is the same as that described in the embodiment described above.

The terminal 72 includes at least an output control unit 721, a storage unit 722, and a processing unit 723. The output control unit 721 controls an output device (e.g., an output device 126 illustrated in FIG. 9C) to output various information. The output device is a device for outputting information and is a liquid crystal display, an organic electroluminescent (EL) display, a speaker, or the like. In the second example, the output control unit 721 is able to output the processing results of the processing unit 723 to the output device.

Figure 9C:
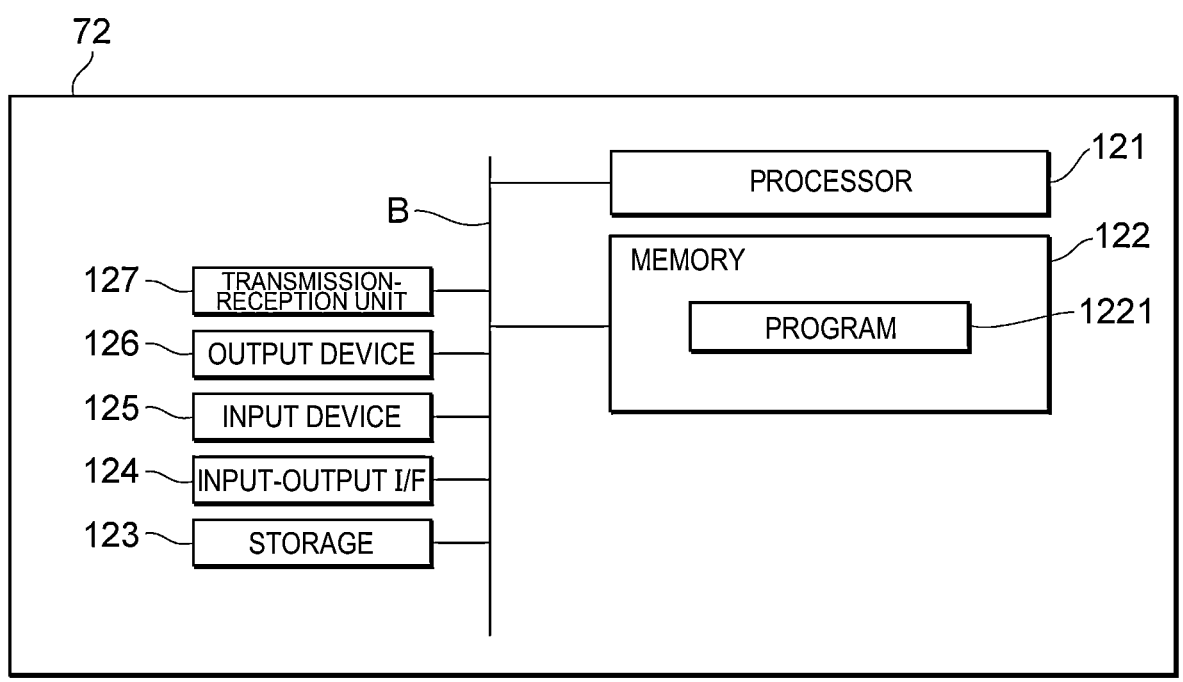
FIG. 9C is a diagram illustrating the hardware configuration of a terminal of the second example of the system using the sensor according to the present invention.

The storage unit 722 is realized by, for example, a storage 123 and/or a memory 122 illustrated in FIG. 9C and stores various information. For example, the storage unit 722 stores patterns of impedance. The storage unit 722 may alternatively be configured to store combinations of user information and patterns of impedance. Herein, the user information is information for identifying a user and may include IDs, full names, and so on.

The processing unit 723 is realized by, for example, a processor 121 illustrated in FIG. 9C and includes the classifier (the classification unit) 312 and an authentication unit 7231. The classifier 312 acquires impedances measured by the sensor 1 and identifies a pattern of the acquired impedances. For example, the classifier 312 is able to identify the pattern based on the peak of impedance. The classifier 312 may alternatively be configured to identify the pattern based on the feature of the waveform of impedance. Alternatively, the classifier 312 may be configured to be a learned model that has learned patterns of impedance in advance. In this case, it is possible to allow an error of a pattern of impedance detected.

The authentication unit 7231 refers to the storage unit 722 to determine whether or not a pattern of impedance identified by the classifier 312 is stored in the storage unit 722, thereby performing authentication. The change in impedance with respect to an input to the structure body 2 differs depending on the user. Therefore, the authentication unit 7231 is able to authenticate the user based on only the pattern of impedance. Alternatively, for example, the authentication unit 7231 may be configured to acquire user information in advance or based on a user's operation or the like to an input device 125 illustrated in FIG. 9C at the time of authentication, and perform authentication based on whether or not the pattern identified by the classifier 312 is a pattern of impedance that is paired with the user information.

Referring to FIG. 9C, the hardware configuration of the terminal 72 will be described. The terminal 72 includes the processor 121, the memory 122, the storage 123, an input-output I/F 124, the input device 125, the output device 126, and a transmission-reception unit 127. As an example not a limitation, the components of the hardware of the terminal 72 are connected to each other via a bus B.

The terminal 72 realizes the processes, functions, or methods described in this disclosure by the cooperation of the processor 121, the memory 122, the storage 123, the input-output I/F 124, the input device 125, the output device 126, and the transmission-reception unit 127.

The processor 121 performs the processes, functions, or methods that are realized by codes or instructions included in a program stored in the storage 123 or the memory 122. As an example not a limitation, the processor 121 includes a central processing unit (CPU), a microprocessing unit (MPU), a graphics processing unit (GPU), a microprocessor, a processor core, a multiprocessor, an application-specific integrated circuit (ASIC), a field programmable gate array (FPGA), and so on, and may realize the processes, functions, or methods disclosed in the embodiment by logic circuits (hardware) or dedicated circuits formed in an integrated circuit (integrated circuit (IC) chip or large scale integration (LSI)) or the like. These circuits may be realized by one or a plurality of integrated circuits, and a plurality of processes described in the embodiment may be realized by a single integrated circuit. LSI may also be called VLSI, super LSI, ultra LSI, or the like depending on the difference in degree of integration.

The memory 122 temporarily stores a program 1221 loaded from the storage 123 and provides a workspace for the processor 121. The memory 122 also temporarily stores various data generated while the processor 121 is executing the program 1221. As an example not a limitation, the memory 122 may be a random access memory (RAM), a read-only memory (ROM), or the like and may be a combination thereof. By the execution of the program 1221 by the processor 121, various processes of the terminal 72 illustrated in FIG. 9B can be performed.

The storage 123 stores programs and various data. As an example not a limitation, the storage 123 may be a hard disk drive (HDD), a solid state drive (SSD), a flash memory, or the like and may be a combination thereof The input-output I/F 124 is for connection to the input device 125 into which various operations to the terminal 72 are input, and to the output device 126 that outputs the processing results processed in the terminal 72.

The input device 125 is realized by any kind of device that can accept an input from a user and transmit information relating to this input to the processor 121, or a combination thereof. As an example not a limitation, the input device 125 may be a touch panel, a touch display, a hardware key such as a keyboard, a pointing device such as a mouse, a camera (operation input via image), a microphone (operation input by voice), or the like and may be a combination thereof.

The output device 126 is realized by any kind of device that can output the processing results processed by the processor 121, or a combination thereof When the processing results are output as an image or a moving image, the output device 126 is realized by any kind of device that can display display data according to display data written in a frame buffer, or a combination thereof. As an example not a limitation, the output device 126 may be a touch panel, a touch display, a monitor (as an example not a limitation, a liquid crystal display, an organic electroluminescent display (OELD), or the like), a head mounted display (HMD), a projection mapping, a hologram, a device that can display an image, text information, or the like in the air or the like (or in vacuum), a speaker (sound output), a printer, or the like and may be a combination thereof. These output devices may be able to display data in 3D.

The input device 125 and the output device 126 may be integrated with each other or may be separated from each other.

The transmission-reception unit 127 performs transmission and reception of various data via a communication line. The communication may be performed in a wired or wireless manner, and any communication protocol may be used as long as it enables the mutual communication. The transmission-reception unit 127 has a function to perform the communication with another information processing device via the communication line. The transmission-reception unit 127 transmits various data to the other information processing device according to a command from the processor 121. Further, the transmission-reception unit 127 receives various data transmitted from the other information processing device and transfers the received data to the processor 121.

Figure 9D:
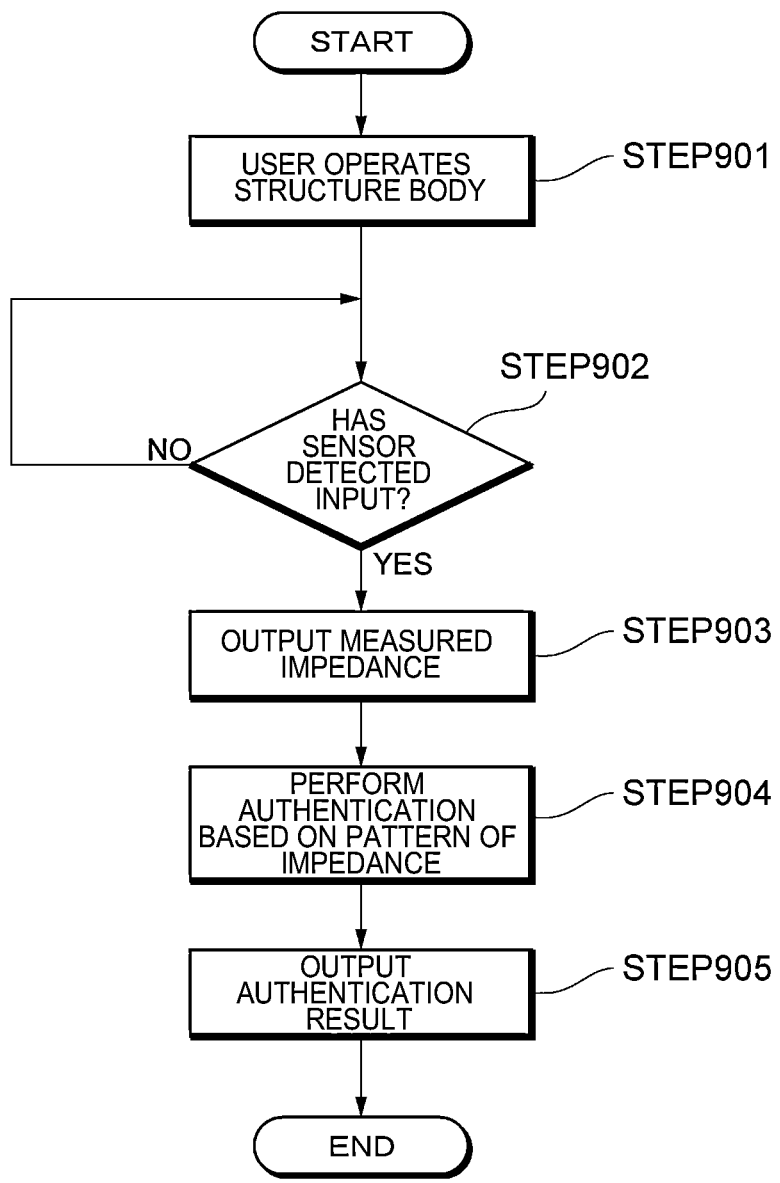
FIG. 9D is a flowchart illustrating the operation of the second example of the system using the sensor according to the present invention.

Referring to FIG. 9D, the processing flow when performing authentication using the sensor 1 will be described. FIG. 9D is one example of a flowchart of the system 19.

When a user performs a predetermined motion to the structure body 2 (STEP901), the sensor 1 detects an input (STEP902: YES). The predetermined motion is, for example, an arbitrary motion such as pushing, pinching, grasping, twisting, or bending, or a combination thereof. When performing the predetermined motion, the user may input user information using the input device 125 or the like.

The impedance measuring instrument 311 measures the impedance that changes due to operating the structure body 2, and outputs the measured impedance to the terminal 72 (STEP903).

In the terminal 72, the classifier 312 of the processing unit 723 identifies a pattern of impedance. The authentication unit 7231 refers to the storage unit 722 to perform authentication based on whether or not the user information acquired at STEP901 and the pattern of impedance identified by the classifier 312 are stored in the storage unit 722 (STEP904). The processing unit 723 outputs the authentication results to the output device (STEP905).

As described above, according to the second example, the terminal 72 is able to perform user authentication by the operation of the user to the structure body 2. Even when the operation to the structure body 2 is the same, the manner of change in impedance of the structure body 2 differs depending on the user. Therefore, in the system 19 of the second example, even when there is no user information for identifying the user, such as user ID, it is possible to perform user authentication. Since the operation to the structure body 2 is used for the authentication, the user does not need to memorize a complicated password so that the convenience for authentication is improved.

Figure 10A:
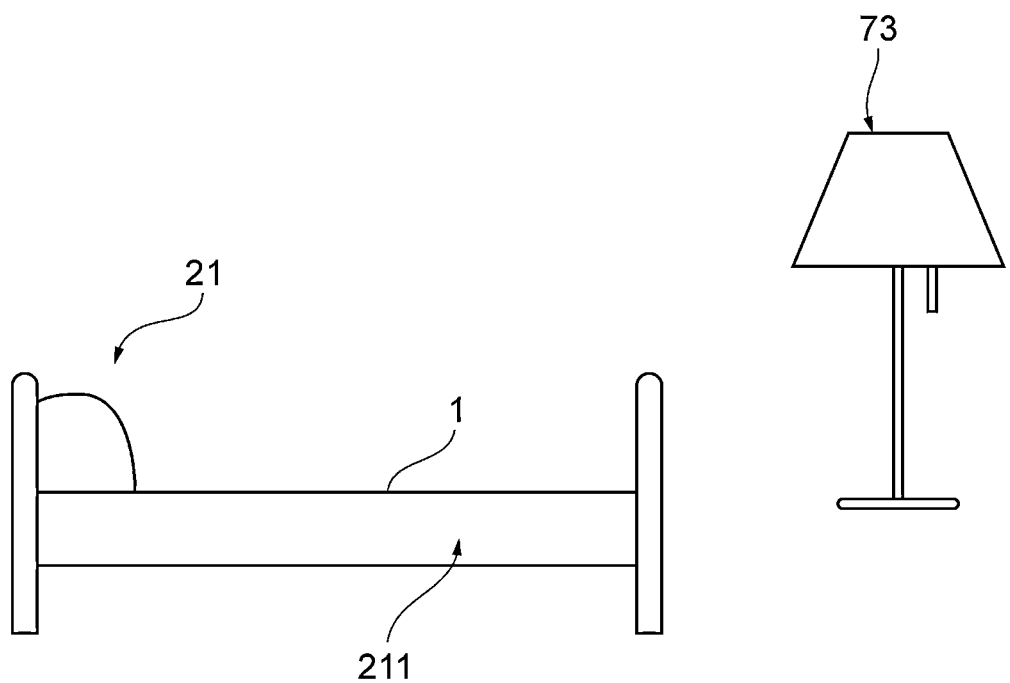
FIG. 10A is a diagram schematically illustrating the configuration of a third example of a system using a sensor according to the present invention.

In the second example, the classifier 312 has been described to be the component of the terminal 72, but the present invention is not limited thereto. The classifier 312 may alternatively be the component of the sensor 1. In this case, the sensor 1 identifies in the classifier 312 a pattern of impedance measured in the impedance measuring instrument 311, and outputs the identified pattern to the terminal 72. The authentication unit 7231 of the terminal 72 performs authentication based on whether or not the received pattern of impedance is stored in the storage unit 722. Third Example Referring to FIG. 10A to FIG. 10C, a system 20 using the sensor 1 according to a third example will be described. FIG. 10A is a diagram schematically illustrating the configuration of the third example of the system 20. In the example illustrated in FIG. 10A, the system 20 includes a piece of furniture 21 and a home appliance 73. In the example of FIG. 10A, the piece of furniture 21 is a bed, but the present invention is not limited thereto. The piece of furniture 21 may alternatively be a sofa or a dining chair. The piece of furniture 21 is provided with a mattress 211. The sensor 1 is provided to an upper surface of the mattress 211. In the example of FIG. 10A, the home appliance 73 is illustrated as an illuminator, but the present invention is not limited thereto. The home appliance 73 may alternatively be an air conditioner, a speaker, a water heater, a coffee maker, or an alarm clock, or an arbitrary combination of them.

Figure 10B:
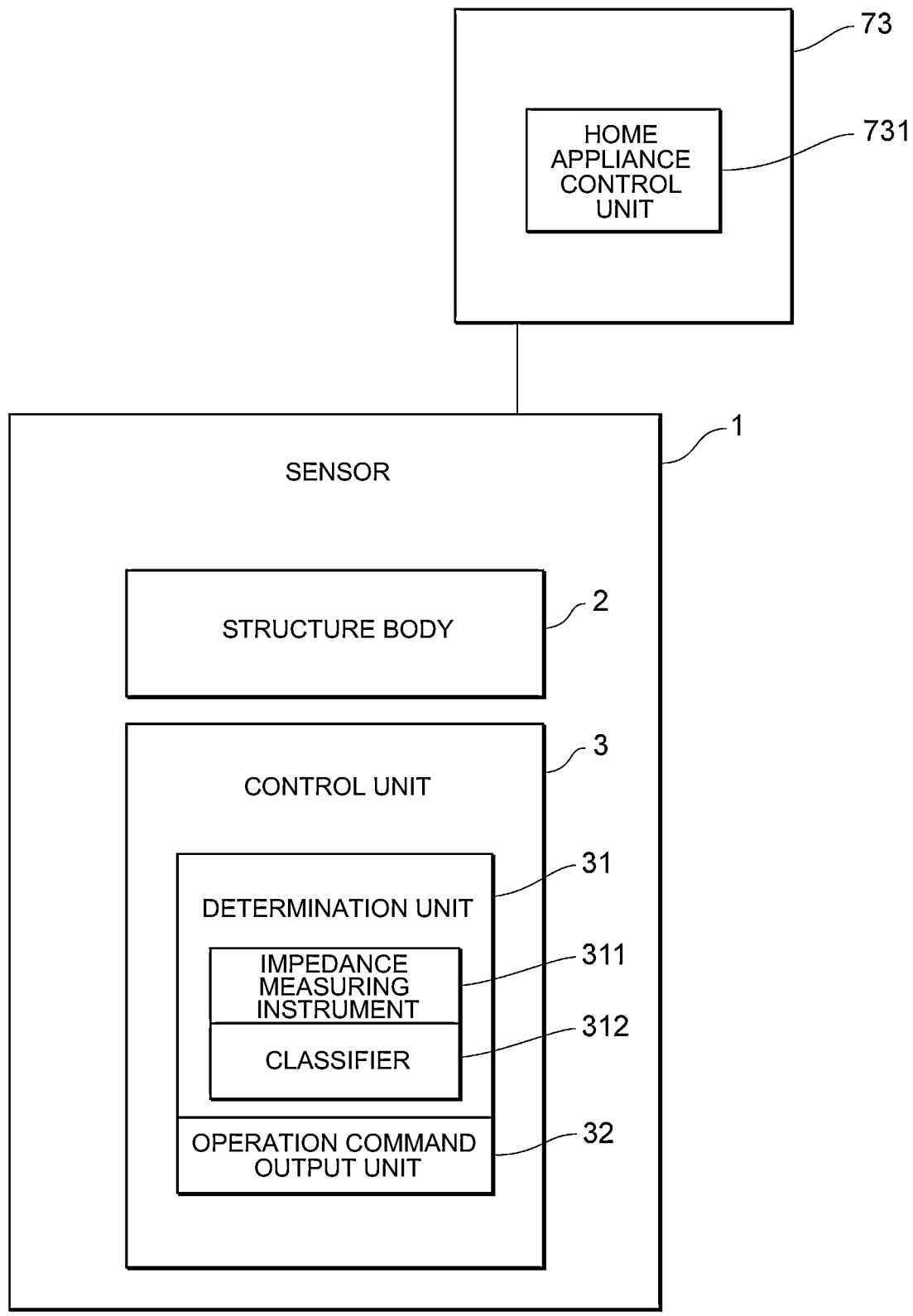
FIG. 10B is a block diagram illustrating the functional configuration of the third example of the system using the sensor according to the present invention.

FIG. 10B is one example of a functional block diagram of the system 20. In the third example, the sensor 1 includes the structure body 2 and the control unit 3. The control unit 3 includes the determination unit 31 including the impedance measuring instrument 311 and the classifier 312, and the operation command output unit 32. The configuration and function of the structure body 2 and the configurations and functions of the respective functional units of the control unit 3 are as described above in the embodiment described above.

The home appliance 73 includes a home appliance control unit 731. The home appliance control unit 731 controls the home appliance 73 according to an operation command output from the operation command output unit 32. For example, when the home appliance 73 is the illuminator or the speaker, the home appliance control unit 731 is able to adjust the light intensity or the volume and perform on-off switching. When the home appliance 73 is the air conditioner or the water heater, the home appliance control unit 731 is able to perform on-off switching and adjust the temperature.

Figure 10C:
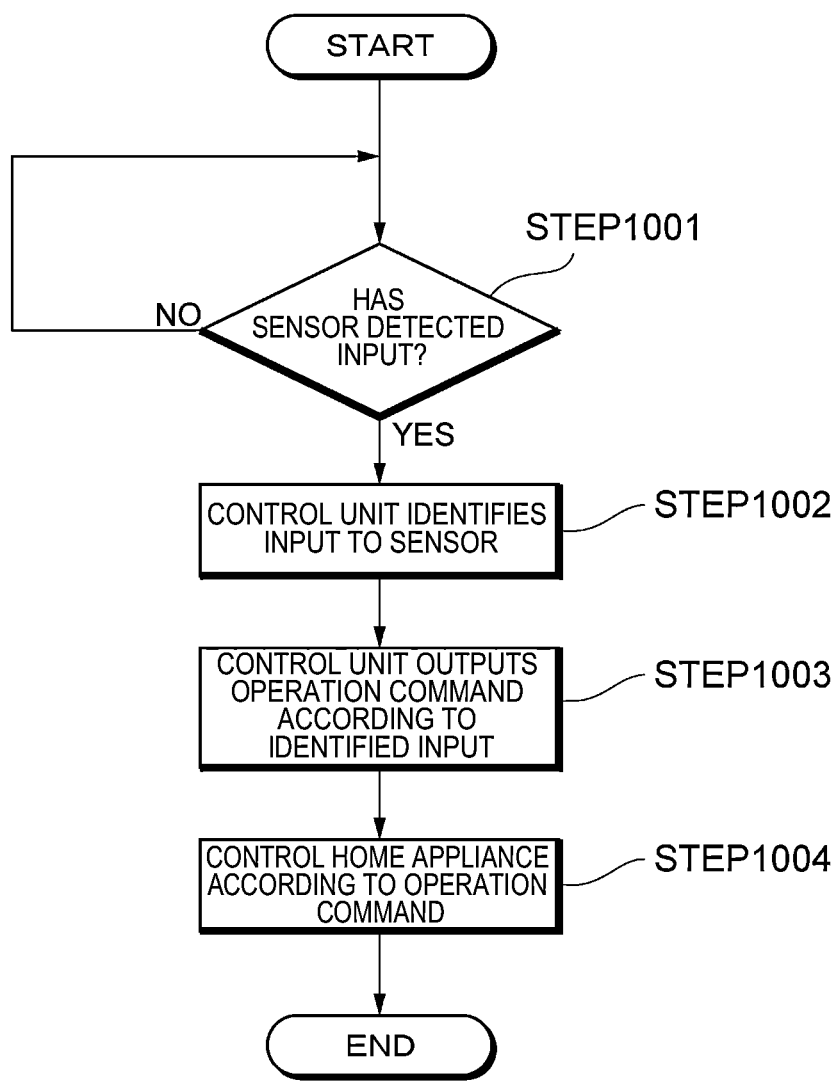
FIG. 10C is a flowchart illustrating the operation of the third example of the system using the sensor according to the present invention.

Referring to FIG. 10C, the processing flow when operating the home appliance 73 using the sensor 1 will be described. FIG. 10C is one example of a flowchart of the system 20. When a user inputs an operation to the sensor 1 provided to the piece of furniture 21, the sensor 1 detects an input by detecting a change in impedance of the structure body 2 (STEP1001: YES). The operation is, for example, a motion in which the user sitting on the mattress 211 lies down, a motion in which the user lying down on the back turns the body sideways, a motion in which the user lying down gets up, or the like.

The control unit 3 identifies the input operation based on the change in impedance (STEP1002), determines an operation command according to the identified input, and outputs the operation command to the home appliance 73 (STEP1003). The home appliance control unit 731 operates the home appliance 73 according to the operation command (STEP1004). For example, when the piece of furniture 21 is the bed, it is possible to turn off the home appliance 73 according to a motion in which the user lies down on the bed. Further, for example, it is also possible to change the volume, the light intensity, or the temperature according to a motion in which the user turns over in bed.

As described above, in the system 20 according to the third example, it is possible to operate the home appliance 73 by the motion performed by the user when using the piece of furniture 21 (e.g., sitting, lying down, getting up, turning over, or the like). Consequently, the convenience of the home appliance 73 is further improved. As a modification of the third example, the sensor 1 may be embedded in clothes such as a jacket instead of the piece of furniture 21 so that it is possible to operate the home appliance 73 by a motion performed by a user wearing the clothes. For example, the sensor 1 may be embedded in a portion corresponding to the back, and consequently, when the user lies down on the back to compress the sensor 1 by the back, the power supply of the home appliance 73 can be turned on, and when the user gets up so that the sensor 1 is not pressed, the power supply of the home appliance 73 can be turned off. Alternatively, it may be configured that the sensor 1 is embedded in a portion corresponding to an elbow so that the sensor 1 can be operated by the user moving the elbow.

As described above, according to this embodiment, the electrode 4 is attached to the structure body 2 that is deformable by an external force, a contact state of an object (a motion of a user, or the like) with respect to the structure body 2 is determined by the determination unit 31 based on a pattern of impedances measured using the electrode 4, and a command corresponding to the determined motion is output to the external device 7 by the operation command output unit 32, thereby causing the external device 7 to perform various operations. Consequently, it is possible to efficiently identify various motions applied to the structure body 2, and further, by mapping the motions and the commands, it is possible to cause the external device 7 to perform a desired operation. Further, since the impedance of the structure body 2 can be measured from the electrode 4 disposed in at least one arbitrary portion, it is not necessary to provide a plurality of electrodes to the structure body 2, attach a plurality of wires to the structure body 2, or dispose an electrode in a specified place of the structure body 2, and therefore, it is possible to use the sensor 1 as a practical input device.

It is preferable to cover the surface (the contact surface with the object) of the structure body 2 with the insulating shield member 6 having a plurality of openings. Consequently, only when certain pressing is applied to the structure body 2, the object directly contacts the structure body 2 at the openings, and therefore, it is easy to identify a motion with different pressing so that the determination accuracy of the motion is improved. Further, when certain or more pressing is not applied, the motion is not detected, and therefore, it is possible to prevent that only mere touching is erroneously determined to be the motion.

In the determination unit 31, it is preferable to determine the motion based on the feature of a waveform of impedance such as the peak frequency and/or the height of the peak of the measured impedance waveform. Consequently, it is possible to efficiently detect the change in impedance by various motions.

It is preferable that the determination unit 31 detect, from the feature of a pattern of impedance, the distance between the contact position of the object with the structure body 2 and the electrode 4, the area of the contact surface, the pressing on the contact surface by the object, the material of the contacting object, or the like. Consequently, it is possible to identify the kind of motion with a different position of touching the structure body 2, with a different strength of touching the structure body 2, with a different part of the human body touching the structure body 2, or the like.

It is preferable that the determination unit 31 determine the contact state of the object by the classifier 312 that has learned the correlation between the pattern of impedance and the contact state of the object with the structure body 2. Consequently, it is possible to deal with detection of various motions. In this embodiment, the determination of the motion is performed using the classifier 312 of the learned model, but the determination of the motion may be performed by another method. For example, the determination of the motion may be performed based on a database mapping the feature of a pattern of impedance (the peak frequency or the height of the peak) and the kind of motion.

The present invention is not limited to the embodiment described above and can be carried out in various other forms within the scope not departing from the gist of the present invention. Therefore, the above-described embodiment is for illustrative purposes only and should not be construed as limiting the present invention in any aspect. For example, the operation command output unit 32 may be an output unit that outputs a signal based on a pattern of impedance. The signal based on the pattern of impedance includes at least one of a pattern of impedance identified by the determination unit 31, a contact state of an object, and an operation command. Consequently, on the side (e.g., the external device 7) that receives the signal output from the output unit, it is possible to arbitrarily map this signal and a predetermined process.

What is claimed is:

1. A sensor comprising:
a structure body configured to be deformable by an external force;
an electrode configured to be able to be attached to an arbitrary position of the structure body;
a determination unit configured to determine one deformation state of the structure body from multiple deformation states of the structure body based on a change in impedance measured using the electrode, for the structure body arbitrarily deformed by an object;
an output unit configured to output a signal based on the one deformation state of the structure body where the electrode is not disposed to an external device; and
an insulating shield member provided on a contact surface of the structure body with the object,
wherein the shield member has a set of openings at which the object comes in contact with the structure body,
wherein the determination unit is configured to distinguish the multiple deformation states based on contacts with the set of openings.

2. The sensor according to claim 1, wherein the determination unit is configured to determine the one deformation state based on a peak frequency and/or a height of a peak of a waveform indicative of the change in impedance measured.

3. The sensor according to claim 1, wherein the determination unit is configured to detect at least one of a distance between a contact position of the object with the structure body and the electrode, an area of a contact surface of the structure body with the object, pressing on the contact surface by the object, and a material of the object based on the change in impedance.

4. The sensor according to claim 1, wherein the output unit is an operation command output unit configured to output an operation command to the external device based on the one deformation state.

5. The sensor according to claim 1, wherein:
the object is a part of a human body; and
the determination unit is configured to perform identity verification based on the change in impedance.

6. The sensor according to claim 1, wherein:
the one deformation state occurs by a specific motion of a user; and
the determination unit is configured to detect the specific motion based on the change in impedance.

7. The sensor according to claim 1, wherein the determination unit is configured to determine the one deformation state from the change in impedance by a learned model having learned a correlation between the change in impedance and the one deformation state.

8. The sensor according to claim 1, wherein:
a first portion of the structure body is assigned as a first button and a second portion of the structure body is assigned as a second button;
the change in impedance corresponds to deformation of the structure body; and
determining the one deformation state includes determining whether the object contacted the first button or the second button based on the change in impedance.

* * * * *